US007027197B2

(12) United States Patent
Newswanger et al.

(10) Patent No.: US 7,027,197 B2
(45) **Date of Patent: *Apr. 11, 2006**

(54) PULSED-LASER SYSTEMS AND METHODS FOR PRODUCING HOLOGRAPHIC STEREOGRAMS

(75) Inventors: Craig Newswanger, Austin, TX (US); Pankaj Lad, Austin, TX (US); Robert L. Sitton, Austin, TX (US); Qiang Huang, Austin, TX (US); Michael A. Klug, Austin, TX (US); Mark E. Holzbach, Austin, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/881,889

(22) Filed: Jun. 30, 2004

(65) Prior Publication Data

US 2004/0240015 A1 Dec. 2, 2004

Related U.S. Application Data

(63) Continuation of application No. 10/167,759, filed on Jun. 12, 2002.

(60) Provisional application No. 60/352,395, filed on Jan. 28, 2002, provisional application No. 60/334,834, filed on Nov. 30, 2001.

(51) Int. Cl.
*G03H 1/04* (2006.01)

(52) U.S. Cl. ........................... 359/35; 359/27; 359/23; 430/1

(58) Field of Classification Search .................... 359/1, 359/23, 27, 35; 430/1–2
See application file for complete search history.

(56) References Cited

U.S. PATENT DOCUMENTS 3,694,218 A * 9/1972 Margerum ..................... 430/1
4,338,578 A * 7/1982 Sukhman ..................... 372/23
4,999,681 A * 3/1991 Mader ........................ 356/457

(Continued)

FOREIGN PATENT DOCUMENTS

WO WO 01/42861 A1 6/2001
WO WO 01/45943 A2 6/2001
WO WO 02/29487 A1 4/2002
WO WO 02/29500 A1 4/2002

OTHER PUBLICATIONS

K.T.Weitzel et al., "Hologram recording in DuPont photopolymer films by use of pulse exposure", Optics Letters, 22(24), pp. 1899-1901(1997).*

(Continued)

*Primary Examiner*—Leonidas Boutsikaris
(74) *Attorney, Agent, or Firm*—Campbell Stephenson Ascolese LLP; Marc R. Ascolese

(57) ABSTRACT

Pre-sensitization techniques can be used in conjunction with holographic recording materials to allow high quality holographic stereograms to be recorded in those holographic recording materials using pulsed lasers. Additional hologram production system hardware and software designs for use with pulsed lasers are disclosed.

20 Claims, 9 Drawing Sheets

U.S. PATENT DOCUMENTS

| | | | | |
|---|---|---|---|---|
| 5,748,347 | A * | 5/1998 | Erickson | 359/23 |
| 5,796,498 | A | 8/1998 | French | 359/4 |
| 6,157,352 | A | 12/2000 | Kollin et al. | 345/8 |
| 6,157,353 | A * | 12/2000 | Song et al. | 345/32 |
| 2003/0137706 | A1 * | 7/2003 | Rmanujam et al. | 359/34 |

OTHER PUBLICATIONS

M.S.Akselrod, "Recording of holographic gratings in photochromic AI2O3:C,Mg crystals", Optical Data Storage 2003, SPIE vol. 5069, pp. 258-263(2003).*

V. N. Mikhailov, K. T. Weitzel, V.N. Krylov, and Urs. P. Wild, "Pulse Hologram Recording in DuPont's Photopolymer Films," *Practical Holography XI*, Proc. SPIE, vol. 3011, Feb. 10-11, 1997, pp. 200-202.

V. N. Mikhailov, K. T. Weitzel, T. Y. Latychevskaia, V. N. Krylov, and Urs P. Wild, "Pulse Recording of Slanted Fringe Holograms in DuPont Photopolymer," *Holographic Materials IV*, Proc. SPIE, vol. 3294, Mar., 1998, pp. 132-135.

"Holography," *SPIE's International Technical Group Newsletter*, vol. 10, No. 2., Dec., 1999, pp. 1-12.

M.V. Grichine, D.B. Ratcliffe and G.R. Skokov, "An Integrated Pulsed Holography System For Mastering And Transferring Onto AGFA or VR-P Emulsions," GEOLA General Optics Laboratory, Proceedings of the SPIE, vol. 3358, 1998, pp. 203-210.

Annex Form PCT/ISA/206, Communication Relating to the Results of the Partial International Search from the Patent Corporation Treaty, Mar. 26, 2003, pp. 1-2 and Patent Family Annex.

* cited by examiner

Printing direction

Printing direction

PULSED-LASER SYSTEMS AND METHODS FOR PRODUCING HOLOGRAPHIC STEREOGRAMS

This application is a continuation of U.S. patent application Ser. No. 10/167,759, entitled "Pulsed Laser Systems And Methods For Producing Holographic Stereograms," filed Jun. 12, 2002, and naming Craig Newswanger, Pankaj Lad, Robert L. Sitton, Qiang Huang, Michael A. Klug, and Mark E. Holzbach as inventors, which in turn claims the benefit, under 35 U.S.C. § 119 (e), of U.S. Provisional Application No. 60/334,834, filed Nov. 30, 2001, entitled "Pulsed-Laser Systems And Methods For Producing Holographic Stereograms," and naming Craig Newswanger, Pankaj Lad, Robert L. Sitton, Qiang Huang, Michael A. Klug, and Mark E. Holzbach as inventors; and of U. S. Provisional Application No. 60/352,395, filed Jan. 28, 2002, entitled "Pulsed-Laser Systems And Methods For Producing Holographic Stereograms," and naming Craig Newswanger, Pankaj Lad, Robert L. Sitton, Qiang Huang, Michael A. Klug, and Mark E. Holzbach as inventors. The above-referenced applications are hereby incorporated by reference herein in their entirety.

BACKGROUND OF THE INVENTION

1. Field of the Invention

The present invention relates in general to the field of hologram production and, more particularly, to hologram production using pulsed lasers.

2. Description of the Related Art

One-step hologram (including holographic stereogram) production technology has been used to satisfactorily record holograms in holographic recording materials without the traditional step of creating preliminary holograms. Both computer image holograms and non-computer image holograms can be produced by such one-step technology. In some one-step systems, computer processed images of objects or computer models of objects allow the respective system to build a hologram from a number of contiguous, small, elemental pieces known as elemental holograms or hogels. To record each hogel on holographic recording material, an object beam is typically directed through a spatial light modulator (SLM) displaying a rendered image and then interfered with a reference beam. Examples of techniques for one-step hologram production can be found in the U.S. Pat. No. 6,330,088 entitled "Method and Apparatus for Recording One-Step, Full-Color, Full-Parallax, Holographic Stereograms," Ser. No. 09/098,581, naming Michael A. Klug, Mark E. Holzbach, and Alejandro J. Ferdman as inventors, and filed on Jun. 17, 1998, ("the '581 application") which is hereby incorporated by reference herein in its entirety.

In general, the hologram production devices (often referred to as "hologram recorders") described in the '581 application can use either continuous-wave (CW) or pulsed lasers as the coherent light source for the object and reference beams used to create interference patterns. Hologram recorders often use CW lasers because they are more commercially available, their output intensity is typically easier to control, and because it is typically easier to find a CW laser that will produce output at a single desired frequency. Moreover, many of the preferred holographic recording materials, such as photopolymerizable compositions, dichromated gelatin, and silver halide emulsions, are particularly suited for use with CW laser sources.

Nevertheless, the use of CW lasers in hologram recorders does present certain limitations. Chief among those limitations is the relatively low output power of CW lasers which causes the hologram recorder to use relatively long exposure times (e.g., tens of milliseconds) for each hogel. During those exposure times, the entire hologram production system is particularly susceptible to mechanical vibration. Great effort is expended to reduce or eliminate the mechanical vibrations. Hologram recorders are typically located far away from sources of environmental vibration, such as outside traffic, building vibration, mechanical equipment, common appliances, human motion, acoustic noise, plumbing turbulence and air flow. Special devices, such as vibrationally-isolated optics tables, are typically used where environmental vibration sources cannot be sufficiently reduced or eliminated. Such devices and techniques add cost and complexity to hologram production systems. Moreover, to help ensure a stable hogel recording environment, a step-repeat approach is often adopted in translating the holographic recording medium. Consequently, additional settling time (on the order of tens of milliseconds as well) is introduced into the recording process. The cumulative recording and settling times prolong the hologram production process, making it more expensive and in some cases impractical for certain applications. Moreover, the mechanical systems used to step the system, bring (or allow) the system to come to a stop, and repeat can be very complex.

Using pulsed lasers in hologram production devices can mitigate or solve many of the aforementioned problems associated with CW laser use. Due to the different physics of pulsed laser operation, a small frame pulsed laser is able to generate higher light intensity than its CW counterparts. For example, small frame frequency doubled Nd:YAG pulsed lasers can generate 1.1 mJ of energy during a 35 ns long pulse at 532 nm. This corresponds to approximately 31.4 kW of power during the pulse. In contrast, a typical CW Nd:YAG laser produces approximately 4 W of power. Because high exposure intensity is possible using pulsed lasers, the required exposure time to generate a hologram can be reduced significantly. While tens of milliseconds is typically needed for CW laser hologram recording, the tens of nanoseconds pulse duration of a pulsed laser is adequate for pulsed laser hologram recording. Decreasing the exposure time by six orders of magnitude means that the frequencies of both the movement of the hologram recorder components and environmental vibration are too low to generate any noticeable effect on interference pattern generation. The mechanical stability requirements restricting the CW laser based hologram recorder are completely relaxed. Consequently, the recorder design can be significantly simplified and the cost of the hardware is reduced.

Despite the advantages of using pulsed lasers in hologram production devices, the holographic recording materials typically used may not provide adequate results when used with pulsed lasers. For example, photopolymerizable compositions (photopolymers) are among the most preferable holographic recording materials because of the image recording capabilities and their relative ease of use. Photopolymers include a wide range of materials that undergo physical, chemical, or optical changes through selective polymerization when exposed to light. Typically, photopolymers include a monomer or a crosslinkable polymer, a sensitizer or photoinitiator, and a binder or liquid to hold the components. Changes in the photopolymer's refractive index, transparency, adhesion, and/or solubility differentiate light and dark regions when these materials are exposed to an activating light source. Photopolymers capable of recording volume phase holograms include those developed by Canon Incorporated (based on polyvinyl carbazole), Polaroid Corporation (based on polyethylene amine/acrylate), and E.I. du Pont de Nemours and Company (based on polyvinyl acetate and polymethyl methacrylate). Those having ordinary skill in the art will readily recognize that a variety of different photopolymer compositions can be used in the practice of the inventions described herein. Nevertheless, preferred photopolymer films are provided by E.I. du Pont de Nemours and Company under the trade designations, for example, OmniDex™ 706, OmniDex™ 801, HRF-800X001-15, HRF-750X, HRF-700X, HRF-600X, and the like.

Holograms recorded in photopolymer films using single laser pulses from pulsed lasers are known to be of generally poorer quality as compared to holograms recorded in photopolymer films using CW lasers. For example, in V. N. Mikhailov, K. T. Weitzel, V. N. Krylov, and Urs P. Wild, "Pulse Hologram Recording in DuPont's Photopolymer Films," *Practical Holography XI*, Proc. SPIE, vol. 3011, pages 200–202, Feb. 10–11, 1997, (the Mikhailov reference) which is hereby incorporated by reference herein in its entirety, it was demonstrated that a hologram recorded with a 25 ns pulse from a YLF-Nd Q-switched laser (0.25 $J/cm^2$ intensity) had a peak diffraction efficiency of approximately 6.5%, while a hologram recorded for 5 seconds using a comparable intensity argon-ion CW laser had a peak diffraction efficiency of approximately 92%. Diffraction efficiency is a typical measurement of the quality of a recorded hologram and is based on the ratio of diffracted light intensity to input light intensity (usually neglecting Fresnel reflection and absorption in the holographic recording material).

The Mikhailov reference goes on to demonstrate that holograms with larger diffraction efficiencies can be recorded using pulsed lasers if the photopolymer film is pre-illuminated. Specifically, the Mikhailov reference demonstrates that pulsed laser recorded holograms can have diffraction efficiencies of approximately 40% and 75% when the photopolymer film is pre-illuminated using a pulse from the pulsed laser and filtered incoherent light, respectively.

Accordingly, it is desirable to have improved systems and methods for using pulsed lasers to produce holograms and particularly holographic stereograms. Such improved systems and methods would provide high-quality recorded holograms while allowing the hologram production systems to take full advantage of the use of pulsed lasers.

SUMMARY OF THE INVENTION

It has been discovered that pre-sensitization techniques can be used in conjunction with holographic recording materials to allow high quality holographic stereograms to be recorded in those holographic recording materials using pulsed lasers. Additional hologram production system hardware and software designs for use with pulsed lasers are disclosed.

Accordingly, one aspect of the present invention provides a method of recording holograms. A holographic recording material is provided. The holographic recording material is pre-sensitized by exposing the holographic recording material to an incoherent broadband light source. The holographic recording material is exposed to an interference patterned formed by a reference beam from a pulsed laser and an object beam from the pulsed laser.

Another aspect of the present invention provides a method of recording holograms. A holographic recording material is provided. The holographic recording material is pre-sensitized by exposing the holographic recording material to a plurality of laser pulses. The holographic recording material is exposed to an interference patterned formed by a reference beam from a pulsed laser and an object beam from the pulsed laser.

Still another aspect of the present invention provides a method of recording holograms. The holographic recording material is pre-sensitized by exposing the holographic recording material to at least one of an incoherent broadband light source and a plurality of laser pulses. At least one of a reference beam from a pulsed laser and an object beam from the pulsed laser is oriented at an oblique angle with respect to the holographic recording material. The holographic recording material is exposed to an interference pattern formed by the reference beam and the object beam.

Yet another aspect of the present invention provides an apparatus for recording holographic stereograms including a pulsed light source that produces a coherent beam, a material holder, and an optical system. The material holder holds a pre-sensitized holographic recording material, the pre-sensitized holographic recording material being pre-sensitized by exposing the holographic recording material to at least one of an incoherent broadband light source and a plurality of laser pulses. The optical system is operable to direct at least a portion of the coherent beam to the holographic recording material.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present inventions may be better understood, and their numerous objects, features, and advantages made apparent to those skilled in the art by referencing the accompanying drawings.

DETAILED DESCRIPTION

The following sets forth a detailed description of the best contemplated mode for carrying out the invention. The description is intended to be illustrative of the invention and should not be taken to be limiting.

The Mikhailov reference and related references such as V. N. Mikhailov, K. T. Weitzel, T. Y. Latychevskaia, V. N. Krylov, and Urs P. Wild, "Pulse Recording of Slanted Fringe Holograms in DuPont Photopolymer," *Holographic Materials IV*, Proc. SPIE, vol. 3294, pages 132–135, March 1998, which is hereby incorporated by reference herein in its entirety, disclose that the pulsed laser object beam and reference beam used to record holograms in pre-illuminated photopolymer films are counterpropagating beams directed at either a 0° or 12° angle of incidence (i.e., measured with respect to the surface normal of the holographic recording material). However, the applicants have discovered that a significant increase in diffraction efficiency of such recorded holograms occurs where the angle of incidence of at least one of the recording beams is oblique, i.e., where the angle of incidence is greater than 12°.

Figure 1:
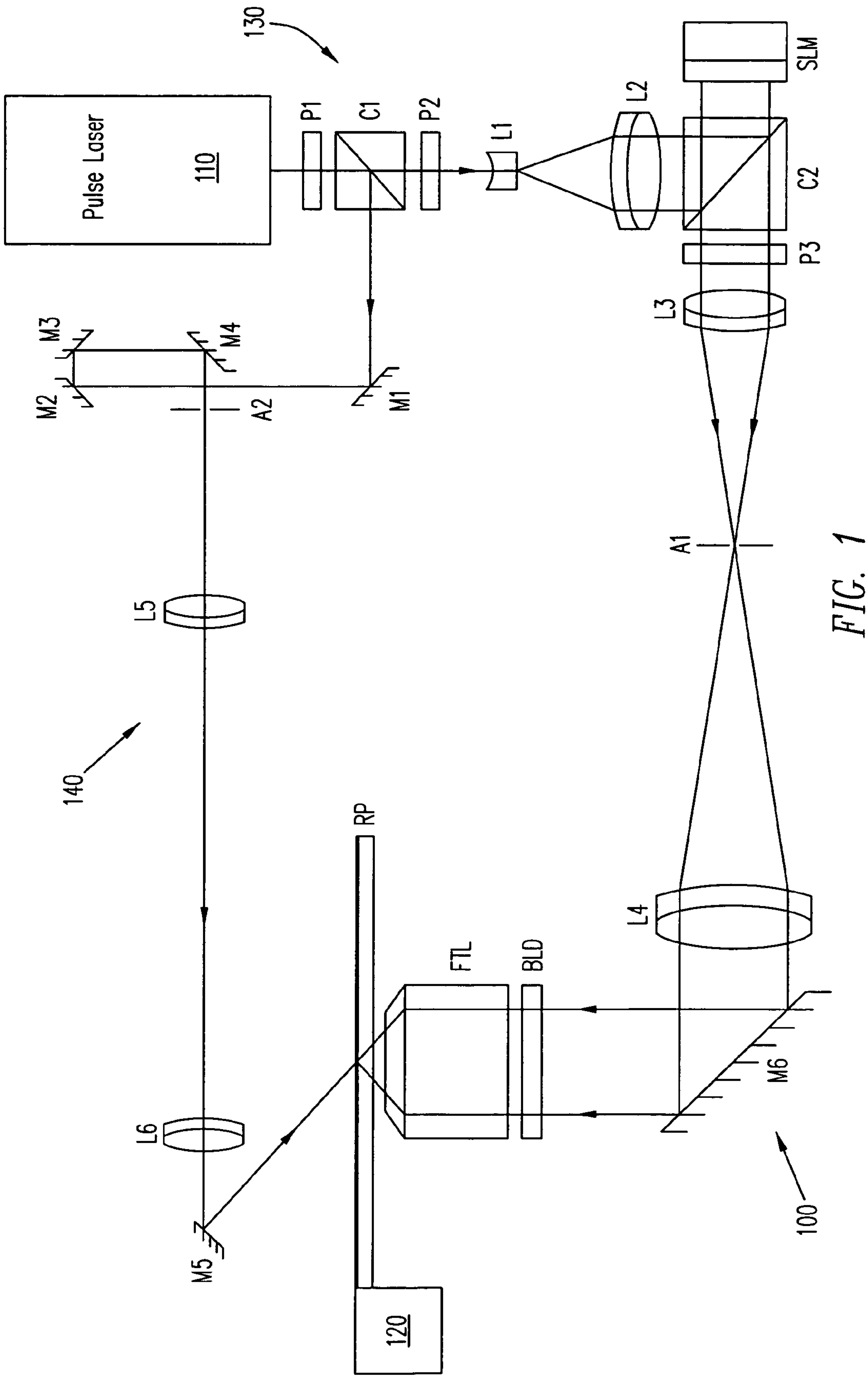
FIG. 1 is a schematic diagram a hologram production device using a pulsed laser.

This is illustrated in FIG. 1, where the angle of incidence of the reference beam in one embodiment of a pulsed laser hologram recording system is approximately 45°. The applicants found that such a recording geometry benefited both pulsed laser hologram recording (particularly pulsed laser hologram recording where the holographic recording material is pre-sensitized as discussed below) and CW laser recording.

The Mikhailov reference discloses two types of pre-illumination that are used to pre-sensitize the photopolymer film prior to recording holograms with a pulsed laser: single laser pulse pre-sensitization and incoherent light pre-sensitization using a green filter. The applicants have developed additional pre-sensitization and hologram recording techniques that provide results superior to those disclosed in the Mikhailov reference. Additionally, the work of Mikhailov et al., demonstrated the effectiveness of their pre-illumination techniques for recording interference patterns with no significant amplitude or intensity modulation of the object beam (i.e., the object beam was merely reflected from a mirror). The applicants, however, have demonstrated the recording of diffuse grating holograms (e.g., using an object beam intensity modulated by a spatial light modulator) using the disclosed devices and techniques.

Incoherent broadband pre-illumination light sources can be used regardless of the wavelength at which the hologram will be recorded. For example, unfiltered halogen, florescent, incandescent, and white-light light emitting diode (LED) light sources can be used to pre-sensitize the holographic recording material. Additionally, narrowband incoherent light sources such as various color LEDs can be used alone or in combination (e.g., a combination of red, green, and blue LEDs) to effectively produce a sufficiently broadband light source.

Pre-illumination of the holographic recording material can be conducted in a scanning fashion, where only a portion of the holographic recording material is illuminated at any one time. Such a pre-illumination technique is particularly suited for hologram production devices designed to utilize a continuous supply of photopolymer material or "web." For example, if the photopolymer web is supplied from a roll of film on one roller and taken-up by a second roller, a stationary light source positioned above the film can pre-sensitize the film as it passes by the light source. Alternately, a light source mounted on a motion control stage or arm can be used to scan the holographic recording material.

The holographic recording material can also be flood illuminated where the entire holographic recording material is simultaneously illuminated. This is particularly suited for hologram recorders designed to record on single tiles or sheets of holographic recording material. Either as part of the hologram recorder, or as part of a separate pre-sensitization stage, a light source can be located above a sheet of the holographic recording material and activated to flood illuminate the holographic recording material. In such examples, the holographic recording material is typically placed on or laminated to a glass or plastic substrate before the holographic recording material is pre-sensitized. The holographic recording material typically remains on the substrate while the desired holograms are recorded in the material, i.e., after pre-sensitization. In the case of the aforementioned Du Pont photopolymer films, laminating the film to the substrate typically involves removing the film's cover sheet and placing the tacky photopolymer film on the substrate surface.

With any type of pre-illumination, the amount of pre-sensitization can be controlled by adjusting the intensity of the light source, the holographic recording material's exposure time to the light source, or some combination of the two. Pre-illumination energy of approximately 2 $mJ/cm^2$ has been successfully used in conjunction with the aforementioned DuPont photopolymers, particularly the OmniDex™ 801 and HRF-700X photopolymers. The applicants have discovered that the pre-sensitization effect does not, in general, decrease with time. Pre-illumination can be conducted a few seconds before hologram recording or hours before hologram recording with no noticeable variation in results. In one example, five hours lapsed between pre-illumination and hologram recording with no noticeable effect on hologram quality. Pre-illumination can also be conducted with a pulsed laser source, e.g., the pulsed laser that is used to create the object and reference beams, using multiple pulses to pre-sensitize the holographic recording material. Moreover, the applicants have discovered that the amount of energy required for adequate pre-sensitization of the photopolymer films can vary depending the wavelength used and/or the wavelength used to record a hologram recorded in the pre-sensitized film. For example, the energy needed for blue pre-sensitization has been found to be approximately half that needed for green pre-sensitization.

High diffraction efficiency holograms can also be recorded using multiple pulse exposure recording. In one example, one portion of the holographic recording material is exposed to the same pulsed laser-created interference pattern multiple times. While it is important to maintain the same optical geometry setup (including the rendered computer graphics image that is typically used to modulate the object beam) from one pulse exposure to the next, pulseto-pulse coherence is not required. Thus, lower energy pulsed lasers (or lower energy pulses from a given pulsed laser) can be used by providing multiple pulse exposure. The highest diffraction efficiencies are achieved where the time between pulses used for multiple pulse exposure is not too short. For example, in an experiment where holograms were recorded in a 25 $mm^2$ area using six 35 ns pulses of 0.5 $mJ/cm^2$, 100 Hz, 1 kHz, and 10 kHz pulse frequencies produced diffraction efficiencies of 89%, 83%, and 12% respectively. Additionally, the multiple pulse exposures need not use the same laser-created interference pattern for each exposure. In an example where the object beam of the system is modulated by an SLM, the first exposure can be created using a "white" image (e.g. a white screen as displayed on the SLM) while the second exposure can be created using the desired image.

Experiments have shown that typical photopolymers have different responses to laser pulse exposure and CW laser exposure. In general for CW laser exposure, recorded holograms show maximum diffraction efficiency when the photopolymer is saturated, and overexposure does not decrease the diffraction efficiency of recorded holograms. However, photopolymers can exhibit a decrease in the diffraction efficiency of recorded holograms if the photopolymer is overexposed with one or more laser pulses.

Tables 1–3 show the results of several other experiments. In each table, the diffraction efficiency of the pulsed laser recorded holograms is shown. For each of the experiments, a pulsed frequency-doubled Nd:YAG laser (532 nm) was used to create an interference pattern that was recorded in a sample of DuPont OmniDex™ 801 photopolymer film, the sample area exposed was 5 mm by 5 mm (Tables 1 and 2) and 10 mm by 10 mm (Table 3), the pulse length was 35 ns, and reference beam was incident on the holographic recording material at an angle of 45° with respect to the normal.

Table 1 shows the results from single pulse exposure experiments where the holographic recording material was pre-illuminated for 5 s with a broadband (e.g., white light) incoherent light source having an intensity of 0.5 $mW/cm^2$. Diffraction efficiency in excess of 90% was obtained. Experiments with the amount of pre-illumination using a halogen white-light showed best results where the total amount of pre-illumination energy was approximately 2.5 $mJ/cm^2$ (e.g., approximately 6 seconds exposure to a halogen source having an intensity of 0.4 $mW/cm^2$). Diffraction efficiency of recorded holograms tended to decrease when the pre-illumination energy was less than or greater than 2.5 $mJ/cm^2$.

TABLE 1

| Pulse Energy per Sample (mJ/Sample) | Pulse Energy per $cm^2$ ($mJ/cm^2$) | Efficiency (%) |
|---|---|---|
| 0.1 | 0.4 | 83 |
| 0.2 | 0.8 | 80 |
| 0.3 | 1.2 | 67 |
| 0.4 | 1.6 | 87 |
| 0.5 | 2.0 | 84 |
| 0.6 | 2.4 | 85 |
| 0.7 | 2.8 | 85 |
| 0.8 | 3.2 | 87 |
| 0.9 | 3.6 | 87 |
| 0.95 | 3.8 | 91 |

Table 2 shows the results from multiple pulse exposure experiments where the holographic recording material was pre-illuminated for 5 s with a broadband (e.g., white light) incoherent light source having an intensity of 0.5 $mW/cm^2$. Each pulse had an energy of 0.1 mJ, and the pulses were repeated by manual triggering. Diffraction efficiencies in excess of 90% were obtained.

TABLE 2

| Number of Pulses | Total Energy per $cm^2$ ($mJ/cm^2$) | Efficiency (%) |
|---|---|---|
| 1 | 0.4 | 61 |
| 2 | 0.8 | 82 |
| 3 | 1.2 | 90 |
| 4 | 1.6 | 87 |
| 5 | 2.0 | 89 |
| 6 | 2.4 | 90 |
| 7 | 2.8 | 92 |
| 8 | 3.2 | 92 |
| 9 | 3.6 | 92 |
| 10 | 4.0 | 93 |

As noted above, over exposure of the photopolymer tended to reduce the diffraction efficiency of recorded holograms. For example, cumulative exposure energies of 8–10 $mJ/cm^2$ tended to reduce diffraction efficiency of the recorded hologram to approximately 87–88%.

Table 3 shows the results from multiple pulse exposure experiments where the holographic recording material was not pre-illuminated. Each pulse had an energy of 0.5 mJ, and the pulses were repeated by manual triggering. Diffraction efficiencies approaching 100% were obtained.

TABLE 3

| Number of Pulses | Total Energy per $cm^2$ ($mJ/cm^2$) | Efficiency (%) |
|---|---|---|
| 3 | 1.5 | 61 |
| 6 | 3.0 | 96 |
| 9 | 4.5 | 98 |
| 12 | 6.0 | 99 |
| 15 | 7.5 | 99 |

Experiments with red (628 nm) and blue (443 nm) laser pulses show that pre-sensitization of the photopolymer is also effective for these wavelengths as well. In one example, the photopolymer was pre-sensitized using white light and energy thresholds (cumulative laser pulse energy) for hologram recording were 12 $mJ/cm^2$ for red laser pulses and 5 $mJ/cm^2$ for blue laser pulses.

FIG. 1 is a schematic diagram a pulsed laser based hologram production device that can take advantage of the above-described pre-sensitization and recording techniques. Hologram recorder 100 is designed to rapidly produce horizontal-parallax-only (HPO) or full parallax holograms and particularly holographic stereograms. The main components of hologram recorder 100 are pulsed laser 110, synchronized holographic recording material translating system 120, object beam optical system 130 and reference beam optical system 140. Although hologram recorder 100 is shown having only one pulsed laser, hologram recorder 100 can in general be constructed with several different pulsed lasers (or one pulsed laser capable of providing laser output at multiple wavelengths) to enable recording of multi-color holograms and holographic stereograms. Thus, the systems and methods described in the aforementioned '581 application can be extended to the use of pulsed laser hologram recorders such as recorder 100

An example of a pulsed laser 110 that can be used in hologram recorder 100 is the 212 Series (e.g., model 212S-532-3500) diode-pumped, Q-switched pulsed Nd:YAG laser manufactured by Lightwave Electronics Corporation of Mountain View, Calif. Those having ordinary skill in the art will readily recognize that a variety of different pulsed lasers can be used in hologram recorder 100 In general, the laser wavelength, laser pulse power, and laser pulse energy of a particular pulsed laser system are the determining factors for use in a hologram recorder.

For multiple color, e.g., red-green-blue (RGB), laser pulses, a variety of different laser systems can be used including diode-pumped solid state lasers, flash-lamp pumped solid state lasers, and dye lasers. Typical solid-state laser gain media include ruby, sapphire, garnet, alexandrite, Titanium sapphire (Ti:sapphire), Neodimium:Yttrium Aluminum Garnet (Nd:YAG), and Neodimium:Yttrium Lithium Fluoride (Nd:YLF). In one example, optical parametric oscillators (OPOs) are used to down convert laser frequency. For example, a frequency tripled Nd:YAG laser can produce 355 nm pulses which in turn drive a tunable OPO to produce pulses ranging from 410 nm to 690 nm. In another example, a Nd:YLF laser produces 1047 nm pulses which are then converted through second-harmonic generation to 523 nm pulses used to drive an OPO. Output from the OPO at 898 nm and 1256 nm can be frequency doubled through second harmonic generation to yield 449 nm and 628 nm pulses respectively. In another example, Raman converters can be utilized. The output of a pulsed alexandrite laser (e.g., 764 nm pulses) is frequency doubled through second harmonic generation to yield 382 nm pulses. These pulses then pass through a Raman cell including Deuterium Hydride (HD) gas. Careful selection of the input pulse can yield, for example, output laser pulse of 443 nm, 527 nm, and 650 nm. Other types of pump lasers, e g., Nd:YAG and Nd:YLF, and other gases for the Raman cell, e.g., Deuterium ($D_2$) or methane ($CH_4$), can be used. Moreover, some combination of all or some of these techniques and lasers can be used to produce the desired pulse wavelengths.

The pulsed laser beam produced by pulsed laser 110 is split into object and reference beams by the beam splitter C1, typically a polarizing beamsplitter cube. The polarizations and relative intensities of the object and reference beams (i.e., the beam ratio) are controlled by retarders P1 and P2, typically half-wave plates.

Figure 1A:
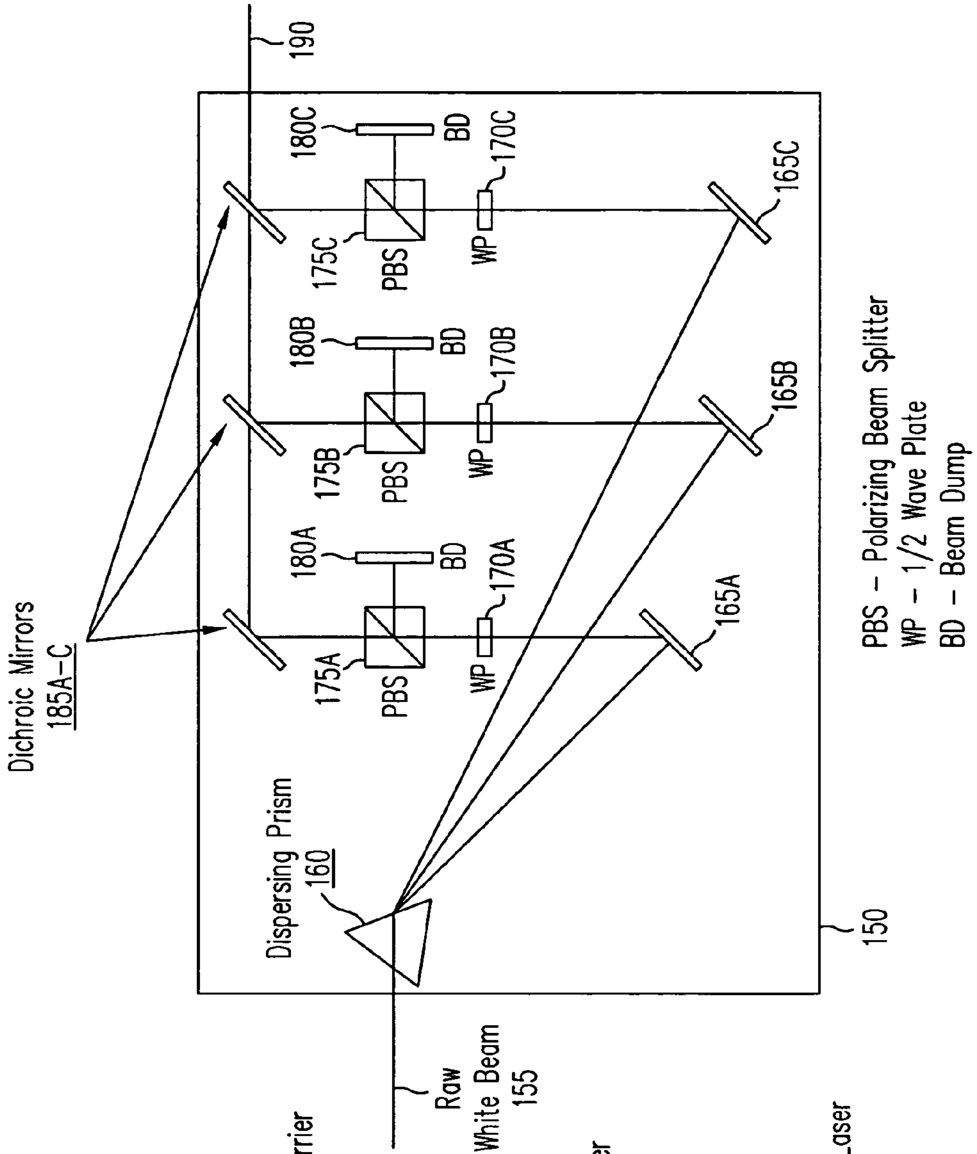
FIG. 1A is a schematic diagram of a color module that can be used with the hologram production device shown in FIG. 1.

Because holographic recording materials typically have different sensitivities to different laser wavelengths, using multiple color laser pulses may require use of a color balancing device such as color module 150 as shown in FIG. 1A. Color module 150 typically receives a multiple color beam 155, referred to generally as a "white" beam. Dispersing prism 160 separates the incoming multiple color beam into its constituent colors. Each beam is then reflected by its associated mirror 165A, 165B, or 165C. Retarders 170A, 170B, or 170C, typically half-wave plates, in conjunction with polarizing beam splitters 175A, 175B, or 175C are used to adjust the respective beam's intensities. Thus the appropriate beam intensity for each color can be achieved. Excess beam energy is directed to beam dumps 180A, 180B, or 180C. The various beams are recombined using dichroic mirrors 185A, 185B, or 185C. The balanced output beam 190 can then be introduced into the remainder of hologram recorder 100

The object beam is then expanded and collimated by a collimator formed through the combination of lenses L1 and L2. Next, the object beam is reflected by beamsplitter cube C2 into spatial light modulator (SLM) SLM where the object beam wavefront is intensity modulated. Spatial light modulator SLM as illustrated is a reflective SLM which rotates the polarization state of the object beam. In general, a variety of different SLMs can be used including, but not limited to, a transmissive LCD panel, a reflective LCD panel, an optically addressed LCD panel, a digital micro-mirror array, film, or a transparency. The SLM typically receives image input via a video cable from a computer system (not shown). Additionally, multiple SLMs can be used having images generated in parallel by multiple central processing units or computer systems. Thus, the response time of the SLM is typically an important parameter. Examples of SLMs for use in hologram recorder 100 include the Digital Direct Drive Image Light Amplifier (D-ILA®) series of reflective LCD devices manufactured by the Victor Company of Japan, Ltd. (JVC). Additionally, a single multiple color SLM can be used, or multiple SLMs can be used (typically one SLM for each beam color). The images displayed on the SLM, and thus the images used to intensity modulate the object beam, are typically computer graphics images (either rendered or converted images of real objects) designed and/or processed for recording as holograms.

The modulated wavefront is relayed and filtered by the lens pair L3 and L4 and aperture A1 to then form an image on a band-limited diffuser or an anisotropic diffuser BLD. Note that, in general, the diffuser can be located in a variety of different positions throughout the system. The image then passes through a Fourier transform lens FTL thereby generating the desired object beam wave front at the holographic recording material positioned on recording plate RP. Note that although hologram recorder 100 is shown using lens pair L3 and L4, to, for example, remove undesired effects such as, but not limited to, high frequency image components such as pixel or grid artifacts that resulted from an SLM display with pixels, a variety of different optical systems can be used.

In reference beam optical system 140, the reference beam is transmitted through path length matching optics (mirrors M1, M2, M3, and M4) and illuminates the reference beam-shaping aperture A2. Path length matching optics are used to adjust the path length of the reference beam path to match that of the object beam, or to at least bring the two paths within a distance of each other that is less than or equal to the coherence length of pulsed laser 110. For some pulsed lasers, the coherence length can be on the order of several millimeters. The image of shaping aperture A2 is then relayed via reference beam relay optics L5 and L6 to the holographic recording material at recording plate RP. As shown, the angle of incidence of the reference beam with respect to the surface normal of the holographic recording material at recording plate RP is preferably oblique, and further preferably approximates 45°. In other examples, the angle of incidence of the reference beam with respect to the surface normal of the holographic recording material is approximately 0°. A variety of different techniques can be used steer either or both of the reference beam and the object beam. For example, the devices and techniques of the aforementioned '581 application can be utilized. Finally, the object and reference beams are superimposed at the holographic recording material on recording plate RP producing the interference pattern required for hologram (or hogel) recording.

In the example of FIG. 1, the optics systems 130 and 140 are generally kept stationary during the operation of hologram recorder 100 while the synchronized holographic recording material translating system 120 is used to reposition the holographic film located at recording plate RP for each hogel that is recorded. Synchronized holographic recording material translating system 120 is typically a computer controlled x-y translation system. In one example, synchronized holographic recording material translating system 120 includes a 300AT series positioning system manufactured by the Daedal Division (Irwin, Pa.) of the Parker Hannifin Corporation and an ACR2000 position controller manufactured by Acroloop Motion Control Systems, Inc., of Chaska, Minn. The synchronization of holographic recording material translation, SLM computer graphics image display, and laser pulsing is further described below in conjunction with FIGS. 4–8. Alternately, the optics system can be designed to move or to provide the object and reference beams at varying locations as described, for example, in the '581 application.

It should be noted that it is well within the skill of one having ordinary skill in the art to substitute different optical components for many of the specific optical components shown in FIG. 1. For example, a variety of different polarizing devices, beam splitters, collimating optics, lenses, SLMs and mirrors can be used in hologram recorder 100 Additionally, although FIG. 1 illustrates a system for producing reflection holograms, systems for producing transmission holograms using the devices and techniques described above can also be implemented.

Figure 2:
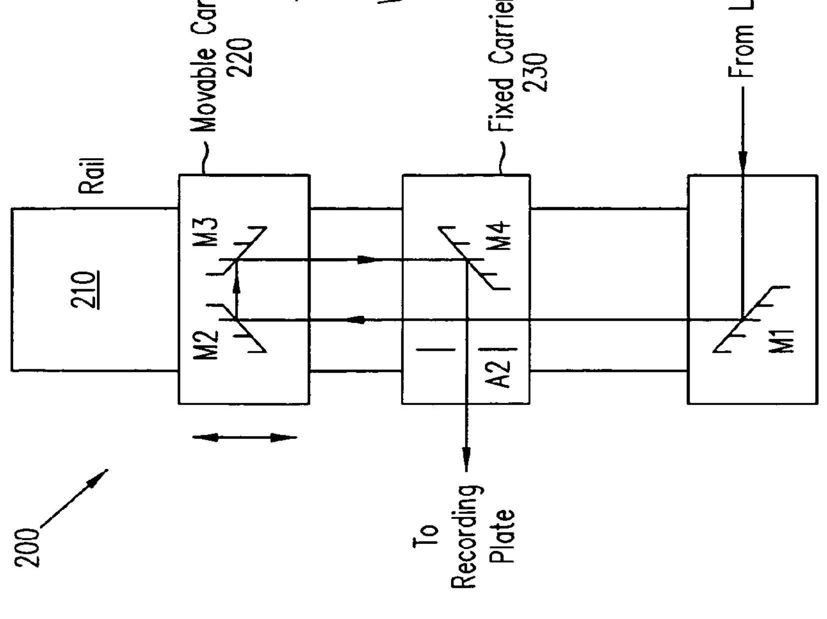
FIG. 2 illustrates an optical path length matching device for use in a hologram production device such as that shown in FIG. 1.

FIG. 2 illustrates an optical path length matching device 200 for use in a hologram recorder 100 Optical path length matching device 200 is a more detailed example of path length matching optics, such as mirrors M1, M2, M3, and M4 of FIG. 1. In order to create a suitable interference pattern using the object and reference beams, it is desirable to maintain the coherence of the two laser beams. The temporal coherence of a laser is often measured in terms of the laser's coherence length, that is the distance the beam will travel during which it remains coherent. For many pulsed lasers the coherence length is only on the order of several millimeters. If the difference in the path lengths of the object and reference beams is greater than the laser's coherence length, the two beams will no longer be coherent and an adequate interference pattern cannot be formed. Optical path length matching device 200 allows hologram recorder 100 to use a pulsed laser with a small coherence length yet still achieve adequate hologram recording.

The reference beam is received from pulsed laser 110 at mirror M1 which reflects the beam to mirror M2. Mirror M1 is typically located at a fixed position in optical path length matching device 200. Mirrors M2 and M3 are mounted together on a movable carrier 220 which is allowed to slide along a straight rail 210. Because of the straightness and rigidity of rail 210, the moving path of the carrier remains parallel to the beam path from mirror M1 to mirror M2 and from mirror M3 to mirror M4. From mirror M4, the reference beam is reflected toward reference beam shaping aperture A2 and on toward the holographic recording material at recording plate RP. Moving the carrier varies the total optical path of reference beam optical system 140 while maintaining beam alignment. Fine position adjustment (e.g., using an attached micrometer) of movable carrier 220 allows the path lengths of the object and reference beams, at least when measured at the respective centers of the beams, to be within microns of each other. The position of movable carrier 220 can be manually adjusted by a hologram recorder operator visualizing a sample interference pattern created using the object and reference beams or computer adjusted using an automatic feedback system that monitors fringe contrast in a sample interference pattern created using the object and reference beams.

Figure 3:
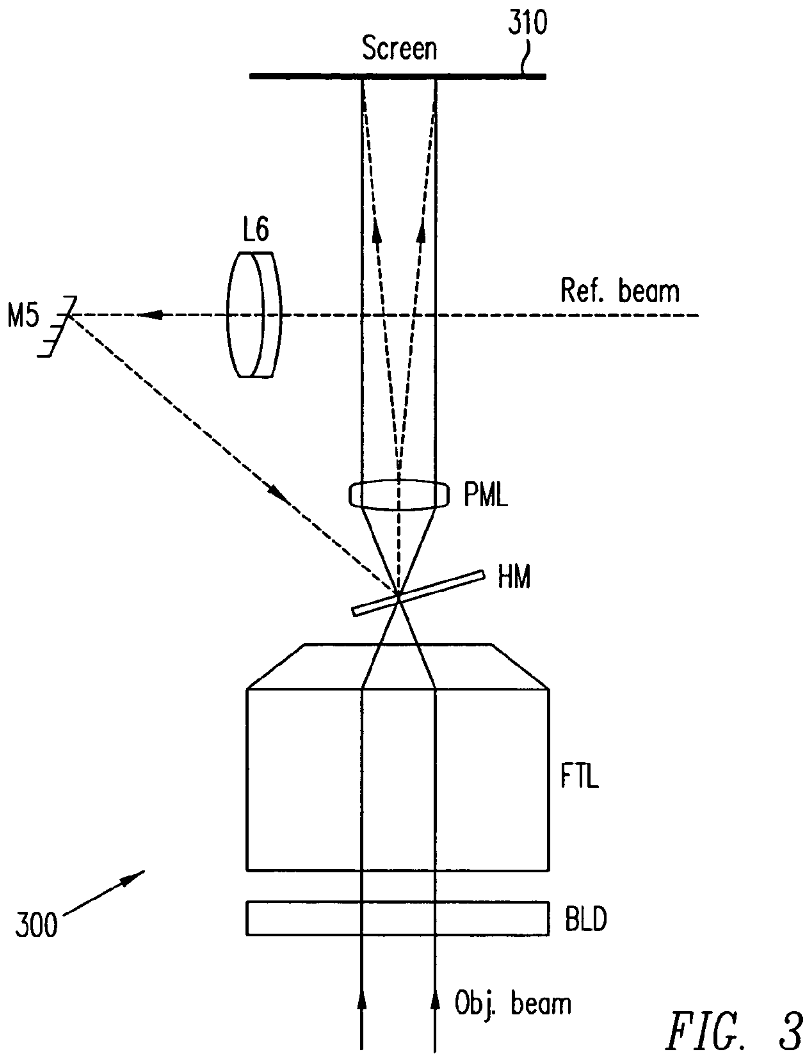
FIG. 3 illustrates an object-beam/reference-beam interferometer for use in a hologram production device such as that shown in FIG. 1.

FIG. 3 illustrates an example of an object-beam/reference-beam interferometer 300 for use in hologram recorder 100 and preferably in conjunction with an optical path length matching device such as optical path length matching device 200. Object-beam/reference-beam interferometer 300 allows an operator of hologram recorder 100 to visualize the interference pattern generated by the superposition of the object and reference beams. Half-mirrored beam combiner HM receives the object beam from previously described Fourier transform lens FTL. A pattern-magnifying lens PML is positioned between half-mirrored beam combiner HM and a projection screen 310 located in the far field. When object-beam/reference-beam interferometer 300 is in use (e.g., in conjunction with the adjustment of the optical path length for the reference beam) half-mirrored beam combiner HM is placed at a point where the object and reference beams overlap. The object beam (illustrated in FIG. 3 as solid lines) transmits through the half-mirrored beam combiner HM while the reference beam (illustrated in FIG. 3 as dashed lines) is reflected by half-mirrored beam combiner HM. By adjusting the angle of half-mirrored beam combiner HM, the object and reference beams can be aligned in front of pattern-magnifying lens PML to form a low frequency interference pattern. Pattern-magnifying lens PML magnifies interference pattern for display on screen 310 for analysis.

Analysis of the fringes can be conducted by a hologram recorder operator. For example, while adjusting the position of movable carrier 220 in optical path length matching device 200 the operator of hologram recorder 100 can observe changes in the interference pattern formed by the object and reference beams. The best optical path length match is indicated by the highest interference fringe contrast observed on screen 310. Typically, a photodetector is used to measure the fringe contrast of the interference pattern either by examining the interference pattern projected on screen 310 or by being positioned in the place of screen 310 to receive the interference pattern. With appropriate detection circuitry, the photodetector can provide a signal for use in adjusting the optical pathlength of reference beam optical system 140.

In addition to assisting in the optical path length matching process, object-beam/reference-beam interferometer 300 can also be used to check hologram recorder 100 system polarization. Object-beam/reference-beam interferometer 300 can also be used to monitor system stability including the presence of undesirable vibrations.

Although hologram recorder 100 of FIG. 1 can, in general, be used to produce HPO holograms, certain system optimizations can be made to produce a recorder more suitable for HPO holograms. As is well known in the art, an HPO hologram does not contain any vertical parallax information and thus its production uses significantly less data than a full-parallax hologram. Moreover, the recording time for an HPO hologram can be significantly shorter than that for a full-parallax hologram. HPO holograms typically have a different hogel structure as compared to full-parallax holograms. Instead of square hogels, or at least hogels having a roughly one-to-one aspect ratio, HPO holograms typically use stretched rectangular hogels having larger aspect ratios. The length of an HPO hogel is usually equal to the entire vertical dimension of the hologram. In addition, recording HPO holograms typically requires film translation (or alternately optics translation) in only one dimension. Due to these differences, a recording mechanism for HPO holograms can be implemented in a number of different ways.

Figure 4:
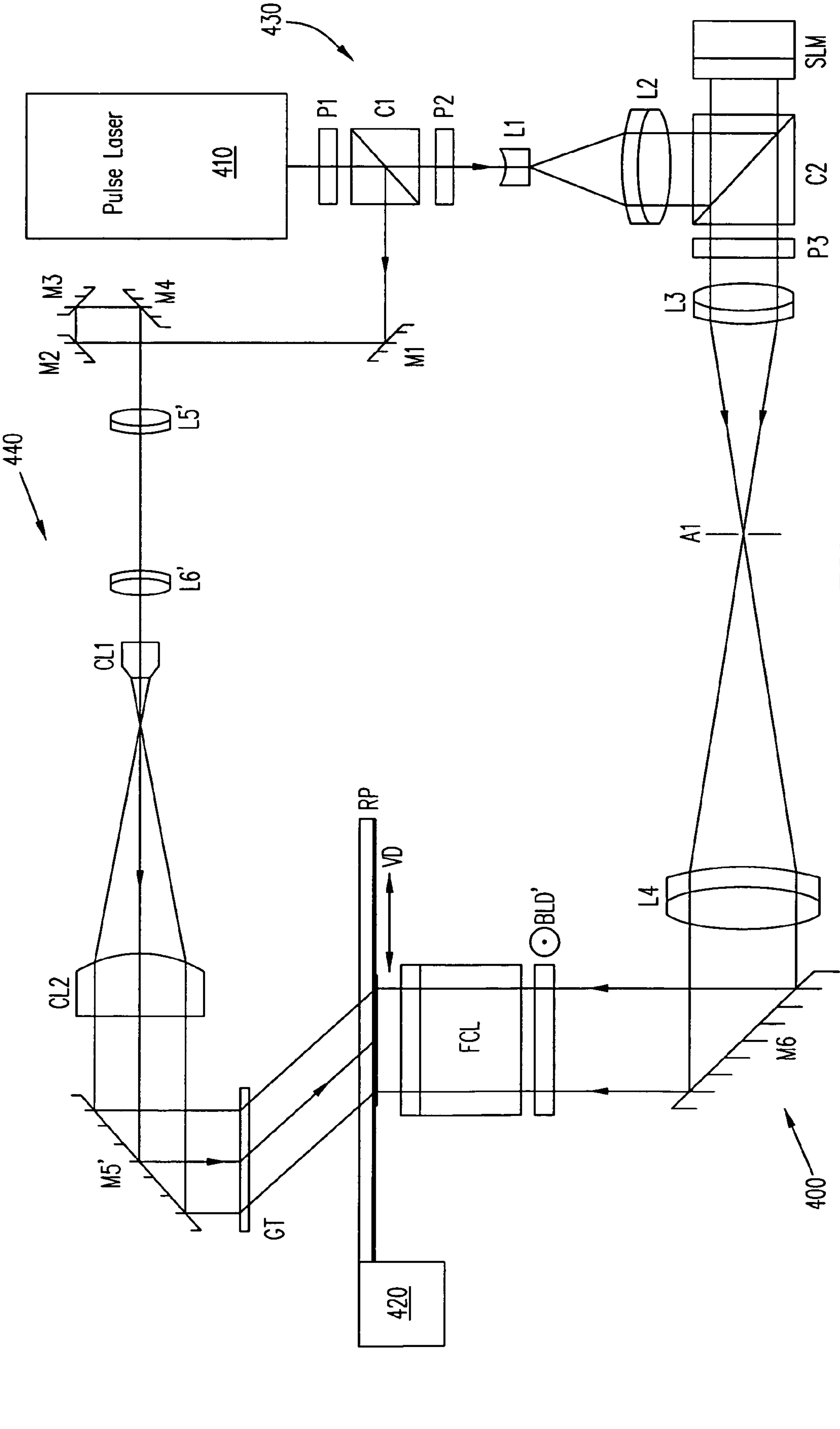
FIG. 4 is a schematic diagram a horizontal-parallax-only hologram production device using a pulsed laser.

FIG. 4 illustrates one example of a pulsed laser based hologram production device optimized for production of HPO holograms and taking advantage of the above-described pre-sensitization and recording techniques. Hologram recorder 400 is designed to rapidly produce HPO holograms and particularly holographic stereograms. The main components of hologram recorder 400 are pulsed laser 410 (generally similar to pulsed laser 110 described above), synchronized holographic recording material translating system 420, object beam optical system 430 and reference beam optical system 440. Although hologram recorder 400 is shown having only one pulsed laser, hologram recorder 400 can in general be constructed with several different pulsed lasers (or one pulsed laser capable of providing laser output at multiple wavelengths) to enable recording of multi-color holograms and holographic stereograms. Thus, the systems and methods described in the aforementioned '581 application can be extended to the use of pulsed laser hologram recorders such as recorder 400.

The pulsed laser beam produced by pulsed laser 410 is split into object and reference beams by the beam splitter C1, typically a polarizing beamsplitter cube. The polarizations and relative intensities of the object and reference beams (i.e., the beam ratio) are controlled by retarders P1 and P2, typically half-wave plates. Because holographic recording materials typically have different sensitivities to different laser wavelengths, using multiple color laser pulses may require use of a color balancing device such as color module 150 as shown in FIG. 1A and described above.

Referring to object beam optical system 430, the object beam is expanded and collimated by a collimator formed through the combination of lenses L1 and L2. Next, the object beam is reflected by beamsplitter cube C2 into spatial light modulator (SLM) SLM where the object beam wavefront is intensity modulated. Spatial light modulator SLM as illustrated is a reflective SLM which rotates the polarization state of the object beam. In general, a variety of different SLMs can be used including, but not limited to, a transmissive LCD panel, a reflective LCD panel, an optically addressed LCD panel, a digital micro-mirror array, film, a projection or a transparency. The SLM typically receives image input via a video cable from a computer system (not shown). Additionally, multiple SLMs can be used having images generated in parallel by multiple central processing units or computer systems. Thus, the response time of the SLM is typically an important parameter. Examples of SLMs for use in hologram recorder 400 include the Digital Direct Drive Image Light Amplifier (D-ILA®) series of reflective LCD devices manufactured by the Victor Company of Japan, Ltd. (JVC). Additionally, a single multiple color SLM can be used, or multiple SLMs can be used (typically one SLM for each beam color). The images displayed on the SLM, and thus the images used to intensity modulate the object beam, are typically computer graphics images (either rendered or converted images of real objects) designed and/or processed for recording as holograms.

The modulated wavefront is relayed and filtered by the lens pair L3 and L4 and aperture A1 to then form an image on a band-limited diffuser or an anisotropic diffuser BLD'. Although BLD' can be the same as or similar to BLD of hologram recorder 100, BLD' can also be a band limited diffuser designed specifically for HPO hologram production as will be described below. Moreover, the diffuser can be located in a variety of different positions throughout the system. The image then passes through a Fourier-transform cylindrical lens FCL thereby generating the desired object beam wave front and forming a "line" shaped hogel exposing area at the holographic recording material positioned on recording plate RP. Since FCL has power only in one dimension, it provides a one-dimensional view zone for the resultant hologram. This view zone is in the horizontal orientation of the hologram to provide the horizontal parallax. To broaden the vertical view zone for the hologram, additional optics denoted as the vertical diffuser VD (described below) can be optionally inserted just before the recording plate RP. If it is desirable to keep the vertical view zone narrow, vertical diffuser VD may not be needed. Alternately, vertical diffuser VD can be located in a different portion of the system. Note that although hologram recorder 400 is shown using lens pair L3 and L4, to, for example, remove undesired effects such as, but not limited to, high frequency image components such as pixel or grid artifacts that resulted from an SLM display with pixels, a variety of different lens systems can be used.

In reference beam optical system 440, the reference beam is transmitted through path length matching optics (mirrors M1, M2, M3, and M4 and as described in greater detail with respect to FIG. 2) and illuminates lens L5'. Path length matching optics are used to adjust the path length of the reference beam path to match that of the object beam, or to at least bring the two paths within a length of each other that is less than or equal to the coherence length of pulsed laser 410. For some pulsed lasers, the coherence length can be on the order of several millimeters.

Next, the reference beam goes through two sets of beam shaping optics. The lens pair L5' and L6' forms a telescope that corrects reference beam divergence and focuses the beam at recording plane RP. After this telescope, cylindrical lens pair CL1 and CL2 serves as a one-dimensional beam expander and collimator so that after lens CL2, the reference beam has the appropriate shape, e.g., a light "ribbon". The length of the image should be long enough to cover the entire vertical dimension of the final hologram. The width of the image, which has a Gaussian profile, is made very thin by adjusting the telescope formed by L5' and L6'. Note that instead of cylindrical optics, other optics can be used to produce the desired reference beam shape. For example, a Powell lens (a particular type of lens having an aspheric tip) can be used to generate a line of quasi-even intensity light. The image width, typically on the order of 100 microns, determines the hogel resolution on the recording plane. After the beam shaping, the reference beam is folded by M5' and then deflected 45° by a diffraction grating GT before illuminating the recording plane. As shown, the angle of incidence of the reference beam with respect to the surface normal of the holographic recording material at recording plate RP is preferably oblique, and further preferably approximates 45°. In other examples, the angle of incidence of the reference beam with respect to the surface normal of the holographic recording material is approximately 0°. Finally, the object and reference beams are superimposed at the holographic recording material on recording plate RP producing the interference pattern required for hologram (or hogel) recording.

In the example of FIG. 4, the optics systems 430 and 440 are generally kept stationary during the operation of hologram recorder 400 while the synchronized holographic recording material translating system 420 is used to reposition the holographic film located at recording plate RP for each hogel that is recorded. Synchronized holographic recording material translating system 420 is generally similar to translating system 120, but need only translate the holographic recording material in one dimension. Examples of such translation systems and their control mechanisms are described elsewhere in this application. Alternately, the optics system can be designed to move or to provide the object and reference beams at varying locations as described, for example, in the '581 application.

It should be noted that it is well within the skill of one having ordinary skill in the art to substitute different optical components for many of the specific optical components shown in FIG. 4. For example, a variety of different polarizing devices, beam splitters, collimating optics, lenses, SLMs and mirrors can be used in hologram recorder 400. Additionally, although FIG. 1 illustrates a system for producing reflection holograms, systems for producing transmission holograms using the devices and techniques described above can also be implemented.

As compared with hologram recorder 100 hologram recorder 400 includes several components tailored to the task of producing HPO holograms. For example, BLD' can be designed to be movable in at least one direction. As illustrated in FIG. 4, BLD' is designed to move in and out of the page. The band-limited diffuser is an optional diffractive optical element that redistributes the object beam across the entire hogel with a uniform intensity. If the diffuser is not used, the object beam would typically have a bright or "hot" spot along the centerline of the hogel. This would make the object-to-reference beam intensity ratio unbalanced and produce a brightness varying hogel. However, using a band-limited diffuser can produce an undesirable side effect. The structure on the diffuser is imaged by the Fourier-transform lens FCL and superimposed on hologram scene in the far field. If the hogel size is large, e.g., 1 mm square, the feature size of the diffuser structure is small and the side effect is not noticeable. However, if the hogel size is small, the corresponding diffuser structure is more noticeable and produces a diffuser pattern on the hologram. An HPO recorder such as recorder 400 typically has a 0.2 mm hogel width. A speckle type of pattern associated with the band-limited diffuser has been observed if the hologram has a bright uniform background.

To minimize the speckle effect on the HPO hologram caused by using band-limited diffusers, the diffuser is mounted on a moving mechanism to make the location of the diffuser vary from hogel to hogel. Consequently, each hogel has a unique far field speckle pattern. The spatial mismatch of speckle patterns from hogel to hogel produces an averaging effect when the hogels been viewed simultaneously. Due to the random nature of the diffuser pattern and associated speckle patterns, the spatial averaging will make the hologram look uniform. Since the recorder is designed for use with pulsed lasers and thus mechanical stability of the diffuser is not critical, diffuser BLD' can be set in motion continuously either by turning, oscillating, or translating.

As mentioned previously, the vertical diffuser VD increases the vertical view zone of an HPO hologram. Since the hologram recorder 400 uses cylindrical lens FCL to produce an angular view zone along the horizontal orientation of the hologram, the vertical orientation of lens FCL has no power. Thus in the vertical direction, the collimated object beam propagates without any divergence. If there were no diffuser VD installed in recorder 400, the hologram would show a vertically truncated viewzone along a narrow horizontal line.

Because an HPO hologram does not contain information of parallax along the vertical orientation, the vertical view zone can be increased simply by inserting a one-dimensional diffuser or lenticular between the lens FCL and recording plate RP. However, this approach can present one drawback. Since recording plate RP is generally transparent, the reference beam will transmit through the plate and strike the diffuser. The diffused reflected light will be sent back to recording plate RP accompanied by the object beam resulting in a hologram that reconstructs both the desired image and the diffusely reflected reference beam. The viewer will see a holographic image with a bright vertical line on top. To overcome this problem, vertical diffuser VD can use a specially designed holographic optical element (HOE) or a lenticular screen combined with an absorber-blocker film. The specialty HOE can be designed to diffract undesired light away from the holographic recording material. The lenticular screen serves as the diffusing medium and the absorber-blocker film prevents the reference beam from reflecting back to the recording plate. Examples of these devices can be found in: (1) U.S. Pat. No. 6,369,920 entitled "Reference Beam Deflecting Element for Recording a Hologram," naming Michael A. Klug as the inventor; and (2) U.S. patent application entitled "Reference Beam Absorber-Blockers," Ser. No. 10/154,497, naming Michael A. Klug, Deanna McMillen, and Qiang Huang as inventors, and filed on May 24, 2002; both of which are hereby incorporated by reference herein in its entirety.

Figure 5:
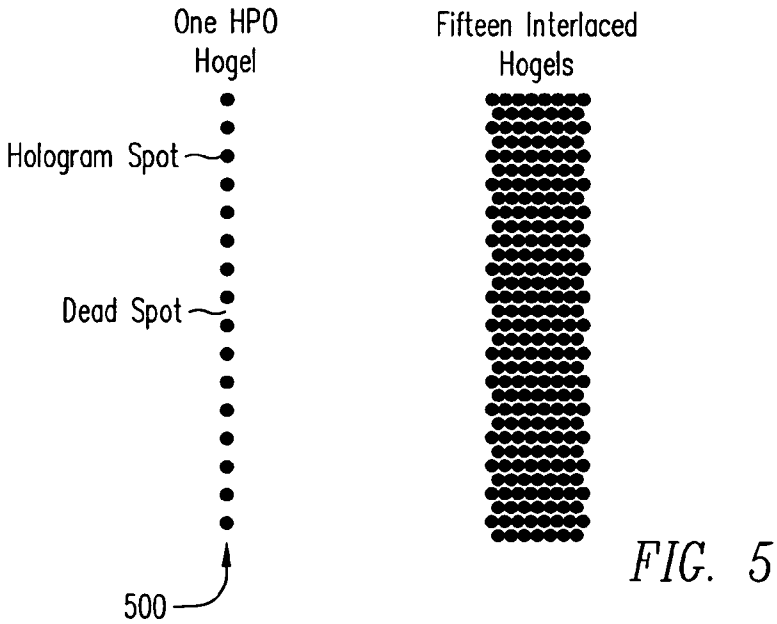
FIG. 5 illustrates an example of interlaced hologram production.

In general, using a lenticular screen as the vertical diffuser is advantageous compared with other kinds of diffuser elements. Each lenticule focuses the portion of object beam illuminating it to a specific spot on the recording material without overlapping to the adjacent spots. Thus, interference or speckle noise caused by random isotropic diffusers is reduced. Additionally, such a diffuser would make it easier to produce interlaced hogels to increase hogel resolution on the image plane. FIG. 5 illustrates an HPO hogel 500 formed by using a lenticular screen diffuser for alternating recorded hologram portions and "dead" spots. Because each lenticule produces a converging object beam and thus a well defined recorded portion. If an adjacent hogel is shifted vertically such that the hologram portions align to the "dead" spots of the previous hogel, interlacing hologram recording is achieved. As an example, fifteen interlaced HPO hogels are shown in FIG. 5.

Figure 6A:
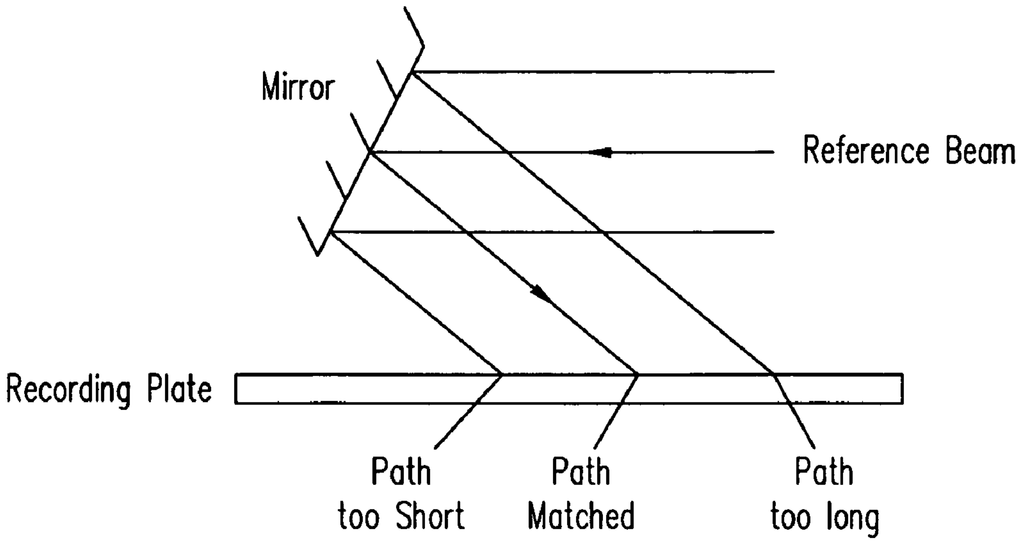
FIGS. 6A and 6B illustrate two different techniques for providing a reference beam in a horizontal-parallax-only hologram production device.
Figure 6B:
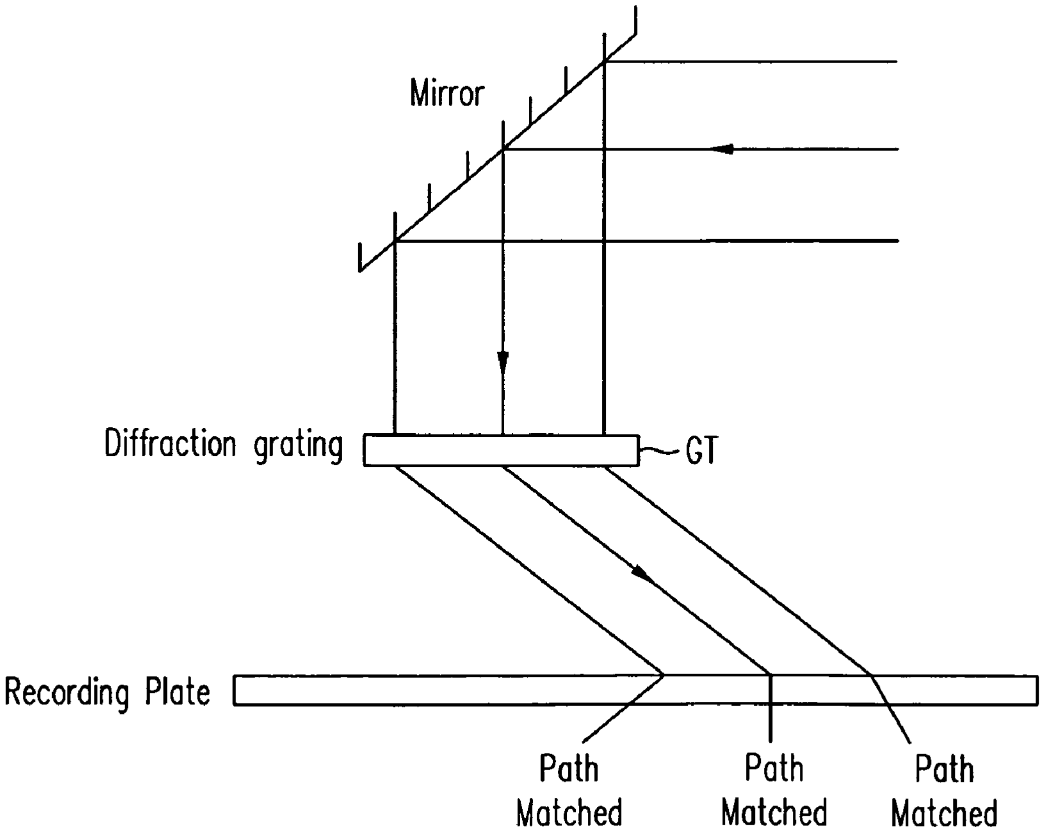

As noted above, HPO recorder 400 utilizes a "ribbon" shaped reference beam that is generally incident on recording plate RP at a 45° angle with respect to the recording plate's surface normal. For each point along the hogel, the beam paths should be closely matched in length. Because of the aspect ratio of the beam, it can be difficult to steer the beam with refractive and reflective optics to achieve object-reference beam path matching on the recording plane. FIG. 6A shows an example using a mirror to steer the beam. Even assuming that the center of the reference beam is matched with the object beam, extremes of the reference beam will still have optical paths that are either too long or too short, as illustrated. To achieve path matching for the reference beam along the entire hogel, a diffraction grating is used to deflect the beam. As illustrated in FIG. 6B, a diffraction grating GT is placed in the reference beam path so that all rays of the reference beam are incident to the grating perpendicularly. The propagation direction of the first order diffraction of the grating is chosen to be 45° with respect to the surface normal of the grating. The deflected first order diffraction beam is used as reference beam for the hologram recording at plate RP. This approach ensures that all rays reaching recording plate RP have an identical optical path length. Although FIG. 6B illustrates a transmissive diffraction grating GT, reflective gratings can also be used. Reflective gratings can be more efficient than transmissive gratings.

Hologram recorders such as recorders 100 and 400 are designed to produce holograms and particularly holographic stereograms at a high rate of speed. In order to accomplish this task, it is very important that the loading of a computer graphics image on spatial light modulator SLM, the positioning of the holographic recording material at recording plate RP, and the triggering of pulsed laser 110/410 be synchronized. In one example of hologram recorder 100 the recorder is designed to record 1 mm by 1 mm hogels using a unique image for each hogel at a rate of 60 Hz (i.e., 60 hogels per second). To achieve this goal, hologram recorder 100 uses holographic recording material translating system 120 to expose each individual hogel in the recording medium by making one pass through a row of hogels using one continuous motion. Hologram recorder 100 exposes a single row using multiple 1 mm exposures. Upon completion of a row, the recording medium is indexed 1 mm vertically and the recording cycle is repeated. Operating such a recording loop requires careful attention to three separate synchronization tasks: (1) translating the holographic recording material at a 60 mm/sec rate; (2) providing the appropriate image data for each hogel recorded; and (3) providing a laser pulse only after the first two tasks are complete.

Figure 7:
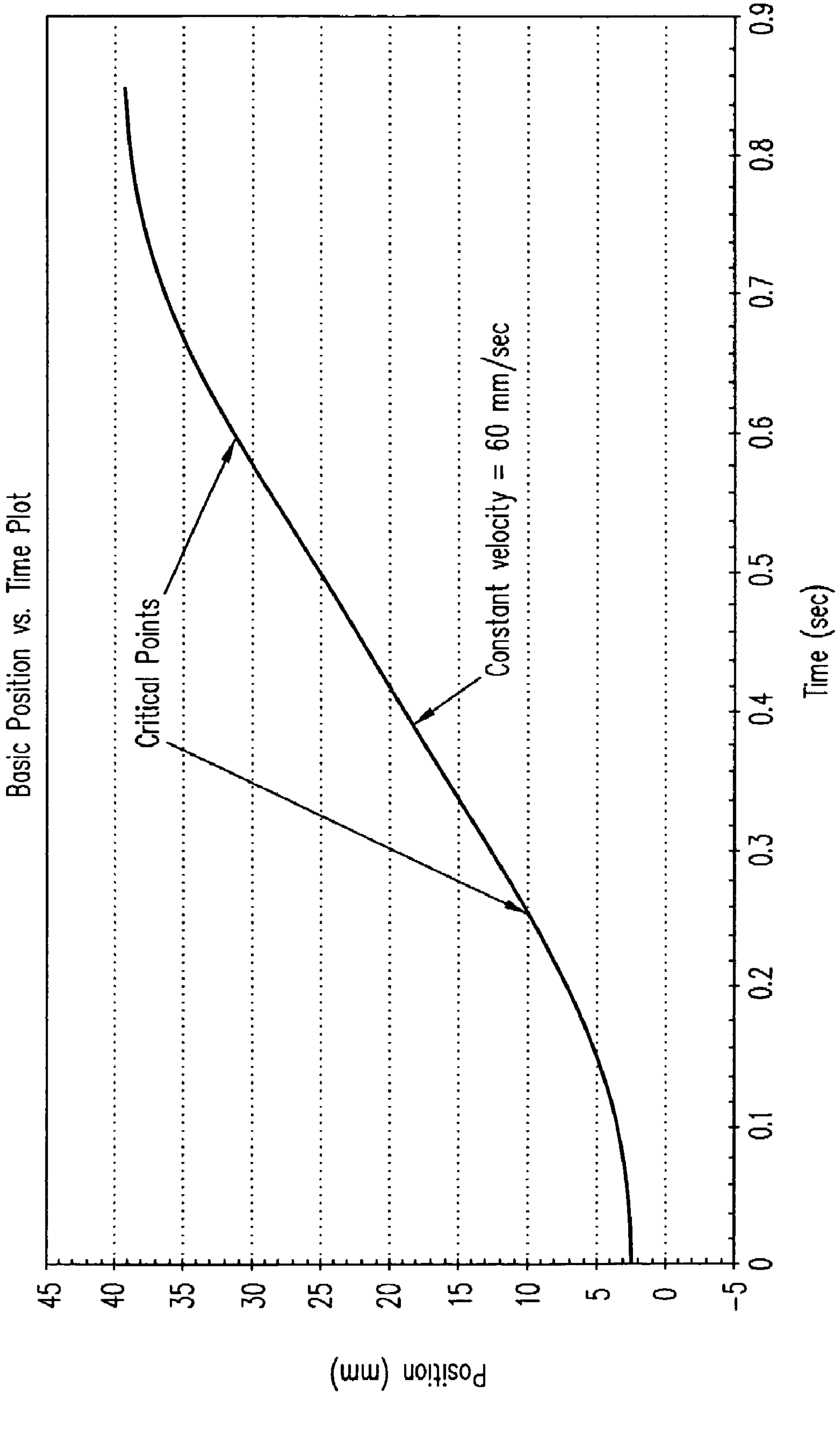
FIG. 7 is a graph showing the motion profile of a linear translator suitable for positioning holographic recording material.
Figure 8A:
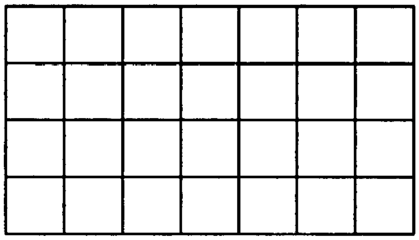
FIGS. 8A and 8B illustrate correct and incorrect positioning of the holographic recording material used in a hologram production device.
Figure 8B:
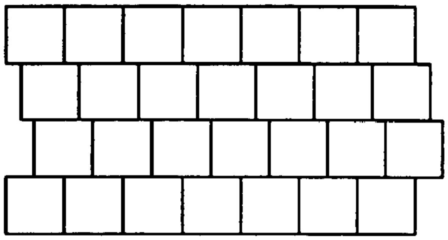

FIG. 7 shows a graph of the motion profile of a linear translator suitable for positioning holographic recording material according to the requirements of the first synchronization task. To perform the task, a linear translator carrying a suitable holographic recording material is accelerated to 60 mm/sec. This velocity is kept constant for the duration of the hogel exposures and then ramped down. The process is repeated for every row of hogels. After the first row of hogels is exposed. subsequent rows of hogels are particularly sensitive to two critical points in the motion of the linear translator, as illustrated in FIG. 7. These points correspond to the beginning and ending of the constant velocity phase of the linear translator's motion. If these two points do not match for every row of hogels, a noticeable artifact at the beginning and/or the end of each row can manifest itself as illustrated in FIGS. 8A and 8B. If every row of hogels begins at the same position along the x-axis, no noticeable alignment artifacts occur as shown in FIG. 8A. But, as shown in FIG. 8B, if hogel exposure begins at an incorrect position for a given row, misalignment artifacts become apparent. Thus, it is important to use position controllers possessing adequate position control, speed, and repeatability.

Figure 9A:
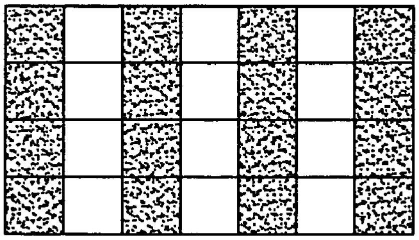
FIGS. 9A and 9B illustrate correct and incorrect image display synchronization with the positioning of the holographic recording material used in a hologram production device.
Figure 9B:
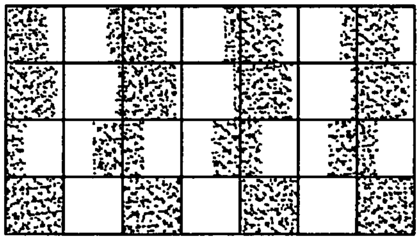

The second synchronization task of delivering a unique image to spatial light modulator SLM for every 1 mm presents additional challenges. Not only is it important that each image for each hogel in a row of hogels be properly displayed on the SLM during the exposure of a row of hogels, but it is also important that each subsequent row of recorded hogels line up with the previous row of recorded hogels. Even though each hogel might be exposed at the right location on the recording media, the content of that hogel, i.e. the image used to record that hogel, may not be in phase with the positioning system. This problem is illustrated in FIGS. 9A and 9B. If the positioning system is exposing hogels at the correct location and the images are arriving in phase for every row of hogels, then the recorded array will appear correct as shown in FIG. 9A. In this case, the image stream alternates between gray and white images. However, even if the hogels were exposed at the correct locations, a mismatch in phase between the stream of images and hogel positions can produce hogels with images that do not line up with subsequent rows as shown in FIG. 9B.

Figure 10:
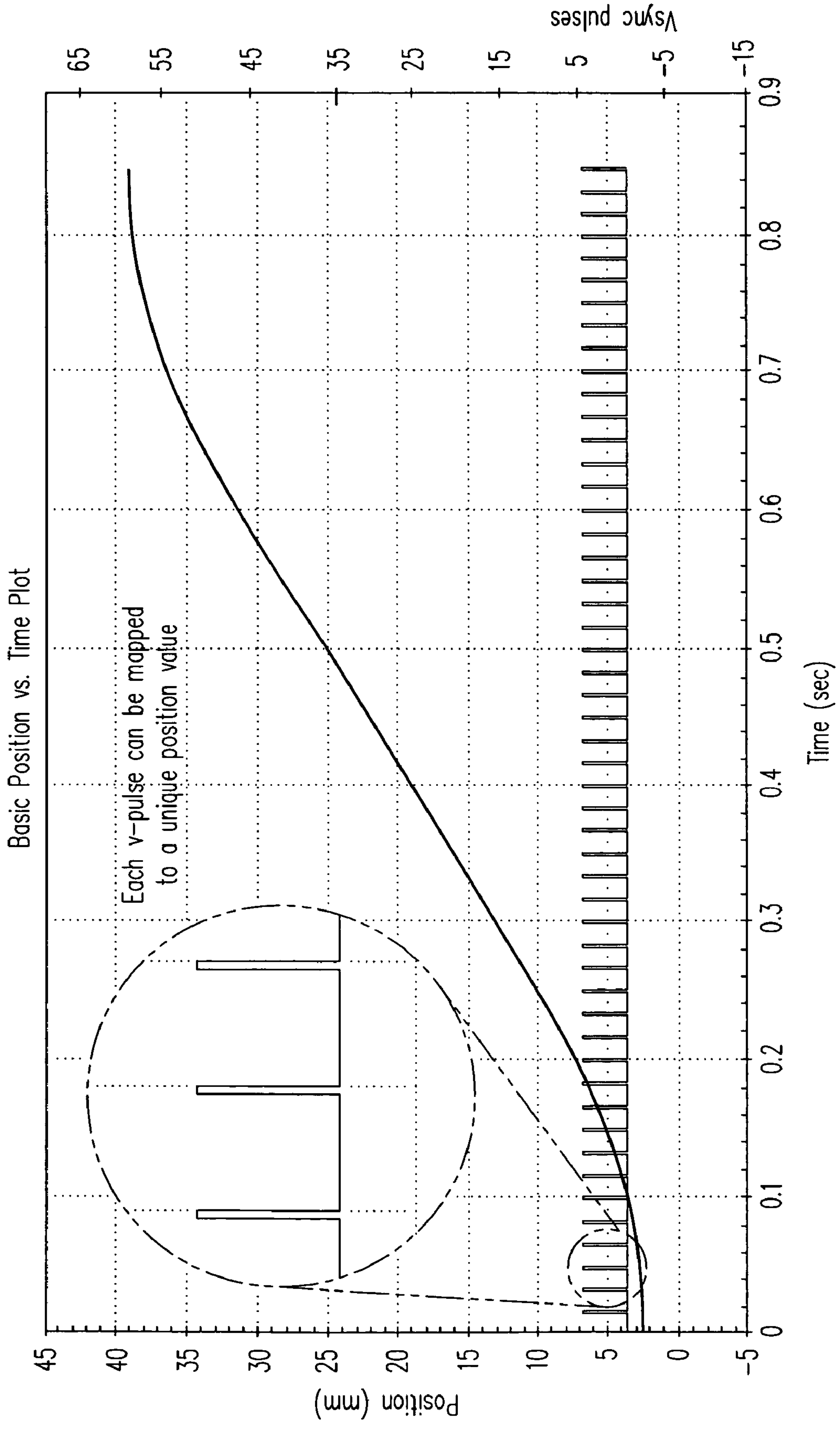
FIG. 10 shows a graph including both the motion profile of a linear translator suitable for positioning holographic recording material and a video frame synchronization signal.

To solve this problem, the positioning system uses information about the image stream. This is accomplished by tapping into the vertical (v-sync) and horizontal (h-sync) synchronization signals provided as part of standard video signals such as those conforming to VGA, SVGA, and XGA standards. The v-sync signal (which typically causes a display device to perform a vertical retrace) and the h-sync signal (which typically causes a display device to perform a horizontal retrace) are used to synchronize the position of holographic recording material translating system 120 with the display of images on spatial light modulator SLM. By correlating the v-sync pulse with position information used to control holographic recording material translating system 120, a constant phase relationship on a hogel-by-hogel basis can be achieved. This correlation is illustrated in FIG. 10. FIG. 10 shows the overlap of a standard v-sync signal with the motion profile of a linear translator. This information can be sent to a positioning controller such that each v-sync pulse represents a unique position of the holographic recording material. The v-sync signal can also be used to trigger the movement profile which ensures a constant phase relationship between subsequent rows.

Figure 11:
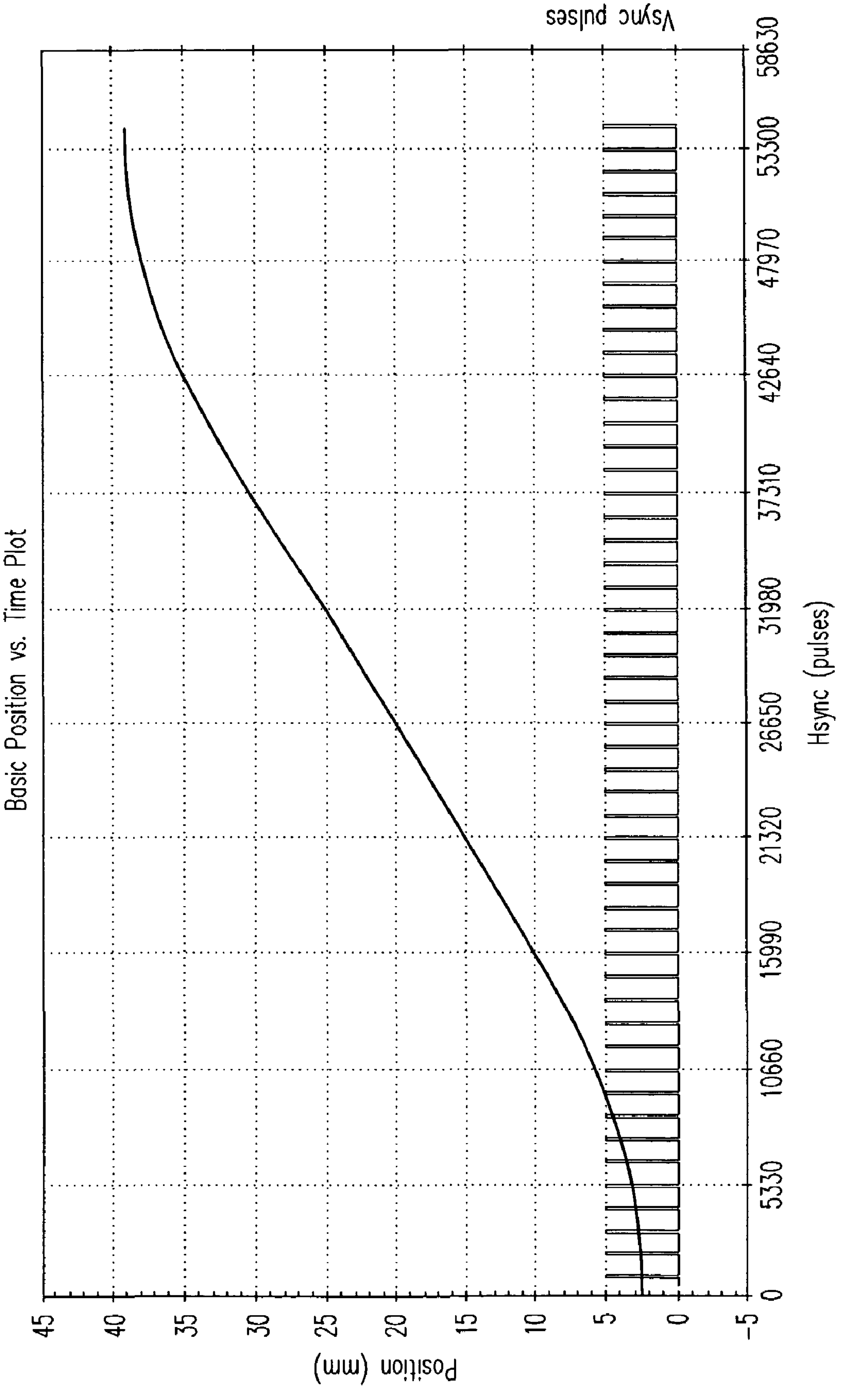
FIG. 11 shows a graph similar to that of FIG. 10 but where the horizontal axis is shown in units with respect to another video frame synchronization signal.

Typical position controllers used in hologram recorder 100 make the correlation between external signals (e.g., v-sync pulses) and position by redirecting the controller's internal time base. However, the v-sync information alone is typically not enough information to adequately control a linear translator because there is insufficient information to interpolate between pulses. The end result of such operation is very jerky movement with instantaneous spikes in acceleration. This problem can be solved by using the much higher frequency h-sync signal in conjunction with the v-sync signal. For example, at a typical SLM resolution with a refresh rate of 60 Hz (i.e., v-sync=60 Hz) the corresponding h-sync frequency is approximately 64 kHz. This higher frequency can give the position controller ample data points between each v-sync pulse thereby allowing for much smoother interpolation between position control data points. FIG. 11 illustrates the concept of time-base redirection. By replacing the standard time axis on the graph with the h-sync pulses, the position controller can have the necessary information from the image stream to accurately coordinate position. In the example illustrated there are exactly 1066 h-sync pulses between each v-sync pulse.

The third task, namely providing a laser pulse only after the first two tasks are complete requires a solution similar to that used for providing the appropriated image data for each hogel recorded. Each laser pulse must have information about the appropriate image in the image stream. For example, if only one laser pulse is to be used to record each hogel, then one pulse must be provided at each hogel position and that one pulse should contain image information for a single image. If multiple pulses are used for each hogel, then several successive pulses containing the same image information can be used at one hogel position. Controlling the activation of the pulsed laser is conveniently performed using a "set output when at position" feature available in many position controllers. Since a v-sync pulse can be used to represent the top of an image frame, a laser pulse should be emitted just prior to the v-sync pulse. This can be achieved by using h-sync pulses to control the placement of the laser pulse. Since there are typically 1066 h-sync pulses between every two v-sync pulses, fine control of the exact timing of each laser pulse can be achieved by triggering the pulsed laser off of an h-sync pulse having an appropriate delay with respect to a v-sync pulse.

As noted above, image synchronization is a particularly important aspect of the hologram recording process. The positioning systems typically used in synchronized holographic recording material translating system 120 can be relatively autonomous and do not necessarily need to be coupled to the computer providing images to the SLM. However, in many cases tight integration of the two systems is preferable. Thus, latencies associated with the various data buses used by the computer can be a problem. For example, if the positioning system is controlled by a controller operating on a PC's ISA bus, the speed, responsiveness, and age of ISA bus technology can be limiting factors. Other limiting but related factors include the manner in which the computer's operating system handles various data buses. In general, faster buses, such as the PCI bus, are therefore desirable. Another example of a relatively low-latency bus is the joystick/mouse port common to most PCs.

Those having ordinary skill in the art will readily recognize that other display related signals can be used to control both holographic recording material translating system 120 and pulsed laser 110. Moreover, the preceding examples have discussed 1 mm by 1 mm hogels, but those having ordinary skill in the art will readily recognize that a variety of differently sized and shaped hogels can be recorded using the methods and devices disclosed in this patent application.

In the example described above, the video source signals are made the "master" and thus the motor controls and laser pulse are slaved to the master signal source. Other display systems could be used allowing the motor control or the laser be the master and the display system the slave. Due to the sophistication of graphics cards available today, it is typically easier to make the video source the master than to design a new graphics system.

In using stepper motors as part of the translation system, various techniques for synchronizing the motor to other signals can be employed. For example, the added resolution associated with using dc servos provides a significant advantage over other techniques. Thus, a variety of phase-locked loop techniques can be utilized including analog or digital hardware, a combination of the two, or a complete software implementation.

In a further refinement of these techniques, one could sample the needed error signal once based on the phase error between the video signal and the motor position and make one phase correction at the beginning of motion using, for example, one of two techniques: a velocity correction within the motor controller or a phase control motor linked to the drive system via a planetary gear system. The phase control motor would allow an independent change in phase without affecting the constant rate of the drive motor. There would be no home position for the phase motor and the phase correction could be made in either direction depending on the shortest motor motion to achieve a phase match. In one implementation, a 1 mm pitch screw is used to produce a hogel pitch of one millimeter. An encoder on the screw shaft would provide an absolute position for each hogel. At the beginning of the move, the timing of the vertical synchronization pulse is compared to the screw position once the main drive motor reached full speed. The measured phase difference is fed to the phase correction motor control. Synchronizing each line of hogels independently should be adequate assuming the motor and the video signal would stay in synchronization for the duration of one line of hogels. In another example, utilizing both horizontal and vertical synchronization signals allows an even higher degree of precision in the motion control.

Many techniques for producing and delivering the computer graphics and digitized images needed for hologram and holographic stereogram production are well known. Nevertheless, a high-speed hologram recorder such as hologram recorder 100 or hologram recorder 400 presents several unique challenges regarding image production and delivery. For example, if all of the computer graphics images for use in a particular holographic stereogram have been collected or rendered, processed, and stored on an appropriate storage device, hologram recorder 100 could simply read the images out in the appropriate order and display those images on spatial light modulator SLM. However to take full advantage of the high-speed nature of hologram recorder 100 it is desirable to include a computer system associated with hologram recorder 100 to support dynamic construction of full parallax and horizontal-parallax-only hogels, to utilize 3D graphics hardware to render the image stream instead of standard 2D interfaces, to use 3D textured geometry to render the image stream, and to store images in an optimal format on the 3D graphics hardware for fast display on spatial light modulator SLM.

In a data preparation phase, the image resolution is set to the appropriate values for the particular images to be recorded. A bit-depth of 32 bits (e.g., 8-bits for each of three colors and an 8 bit alpha channel) ensures smooth gradients. Image dithering at 16 bits can also be used to prepare the image data using lower bit-depth. Next, images are loaded into memory (typically the RAM of the computer system providing the images or the RAM associated with the graphics hardware used to provide the images to spatial light modulator SLM). Some interpolation of the images is typically performed to match the image dataset to the available memory and recorder metrics. In the case of horizontal-parallax-only holographic stereograms, the images are typically transformed and stored in graphics hardware memory; no further processing is required.

During a recording phase, system synchronization and hogel recording are performed. To begin the process of recording a row of hogels, a line start flag is sent to the position controller hardware associated with synchronized holographic recording material translating system 120. This signals hologram recorder 100 that processing of the image set for the next row of hogels is complete and that the computer system is waiting for the hologram recorder to record the next line of hogels. A line wait flag is polled on the position controller hardware. This flag is used to start the recorder and the rendering of images on next v-sync signal. Next, the computer system provides image data for one hogel on each v-sync signal. These images for these hogels are typically stored on computer graphics hardware and rendered by the hardware as discussed below. A column completion routine in the software executing on the computer system is next used to adjust relevant recorder values and increment the column counter for the next column of hogels. In the next stage, a waiting for recorder flag is polled. During this stage, the next column of hogels is generated for the full parallax holographic stereograms. A typical horizontal-parallax-only holographic stereogram will have only one row of hogels. When the column is complete, the recorder is checked to determine if the waitingfor recorder flag is set before continuing on to the next column of hogels.

During a rendering phase typically proceeding a recording phase, operation can differ depending on the recording of horizontal-parallax-only holographic stereograms or holographic stereograms with both horizontal and vertical parallax (full parallax). The rendering phase can include the reparameterization of image data as described, for example, in U.S. patent application Ser. No. 10/036,814, entitled "Efficient Block Transform Including Pre-processing and Post Processing for Autostereoscopic Displays," filed Oct. 19, 2001, and naming Emilio Camahort, Mark E. Holzbach and Robert L. Sitton as the inventors, and which is hereby incorporated by reference herein in its entirety. Horizontal-parallax-only rendering uses a single row of horizontal directional views. The reparameterization of the single row of horizontal directional views typically results in a set of hogel images each having only one row of pixels. The row of pixels is typically scaled as necessary to fill the spatial light modulator of the hologram recorder. For full parallax holographic stereograms, the rendering phase typically displays entire hogels on the spatial light modulator scaled as necessary. In some examples of the rendering phase, reparameterization is performed in real time. Thus, the software assembling the hogel views specifically selects the appropriate point of light from the image data set (i.e., the source images) and places it at the appropriate location within the hogel view. If the desired point of light from the image data set exists between two hogel views, sub-sampling can be performed. If the desired point of light from the image data set does not exist (e.g., the data is missing or the source image resolution is too low) an average of data points can be performed.

The various phases of producing image data for the hologram recorder and providing that data to the hologram recorder are typically performed by specialized computer software executing on one or more computer systems. Those having ordinary skill in the art will readily recognize that the techniques and methods discussed above can be implemented in software using a variety of computer languages, including, for example, traditional computer languages such as assembly language, Pascal, and C; object oriented languages such as C++ and Java; and scripting languages such as Perl and Tcl/Tk. Additionally, the software can be provided to the computer system via a variety of computer readable media including electronic media (e.g., flash memory), magnetic storage media (e.g., hard disk drives, a floppy disk, etc.), optical storage media (e.g., CD-ROMs), and communications media conveying signals encoding the instructions (e.g., via a network coupled to a network interface in the computer system). The computer system or systems typically used include devices such as a keyboard, a mouse, a network interface, a graphics & display hardware, a hard disk drive, and a CD-ROM drive, all of which are coupled to a processor by a communications bus. It will be apparent to those having ordinary skill in the art that such computer system can also include numerous elements not described, such as additional storage devices, communications devices, input devices, and output devices.

Those having ordinary skill in the art will readily recognize that a variety of different types of optical components can be used in place of the components discussed above. Moreover, the description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. An apparatus for recording holographic stereograms, comprising:

- a pulsed light source that produces a coherent beam, wherein the pulsed light source further comprises an optical parametric oscillator configured to produce at least two substantially different wavelengths;
- a material holder holding a holographic recording material, wherein the holographic recording material is pre-sensitized by exposing the holographic recording material to a plurality of laser pulses; and
- an optical system operable to direct at least a portion of the coherent beam to the holographic recording material, wherein the at least a portion of the coherent beam is oriented at an oblique angle with respect to the holographic recording material.

2. The apparatus of claim 1 wherein optical system further comprises:

- a beam splitter that splits the coherent beam into an object beam and a reference beam;
- an object beam optical system for directing the object beam to interfere with the reference beam at the holographic recording material; and
- a reference beam optical system for directing the reference beam to interfere with the object beam at the holographic recording material.

3. The apparatus of claim 2 wherein at least one of the reference beam optical system and the object beam optical system includes an optical pathlength matching device comprising:

- a first stationary mirror positioned to reflect at least one of the reference beam and the object beam;
- at least one movable mirror positioned to receive the at least one of the reference beam and the object beam from the first stationary mirror and reflect the at least one of the reference beam and the object beam; and
- a second stationary mirror positioned to receive the at least one of the reference beam and the object beam from the at least one movable mirror; wherein the optical pathlength of the at least one of the reference beam and the object beam is adjusted by moving the at least one movable mirror.

4. The apparatus of claim 2 wherein the object beam optical system includes a spatial light modulator for intensity modulating the object beam.

5. The apparatus of claim 4 further comprising:

- a computer coupled to the spatial light modulator and programmed to control delivery of a rendered image to the spatial light modulator.

6. The apparatus of claim 5 further comprising:

- a material holder translation system operable to position the material holder holding the holographic recording material.

7. The apparatus of claim 6 wherein the computer is coupled to the material holder translation system and is further programmed to synchronize positioning of the material holder translation system with delivery of the rendered image to the spatial light modulator.

8. The apparatus of claim 7 wherein:

- a velocity of the material holder translation system is kept constant for the duration of one row of hogel exposures.

9. The apparatus of claim 7 wherein:

- the computer is further programmed to synchronize positioning of the material holder translation system with at least one of a vertical synchronization signal and a horizontal synchronization signal provided with the rendered image to the spatial light modulator.

10. The apparatus of claim 5 wherein the pulsed light source is triggered based on at least one of a vertical synchronization signal and a horizontal synchronization signal provided with the rendered image to the spatial light modulator.

11. The apparatus of claim 2 further comprising:

- at least one of a transmissive diffraction grating and a reflective diffraction grating positioned to diffract the reference beam so as to enhance path matching for the reference beam when the reference beam strikes the recording material.

12. The apparatus of claim 1 further comprising:

an incoherent broadband light source positioned to presensitize the holographic recording material.

13. The apparatus of claim 12 wherein the incoherent broadband light source includes at least one of: a halogen light source, florescent light source, an incandescent light source, a white-light light emitting diode (LED) light source, and a plurality of narrowband incoherent light sources.

14. The apparatus of claim 12 wherein the incoherent broadband light source is further positioned to only expose a small portion of the holographic recording material.

15. The apparatus of claim 1 wherein the at least a portion of the coherent beam is oriented at an angle of approximately 45° with respect to a surface normal of the holographic recording material.

16. The apparatus claim 1 wherein the holographic recording material is one of a photopolymer, a dichromated gelatin, and a silver halide emulsion.

17. The apparatus of claim 16 wherein the holographic recording material is a photopolymer laminated to a substrate.

18. The apparatus of claim 1 wherein the plurality of laser pulses are provided by the at least a portion of the coherent beam.

19. The apparatus of claim 2 wherein the optical system is further operable to repeatedly expose a portion of the holographic recording material a plurality of times to an interference pattern formed by the reference beam and the object beam.

20. The apparatus of claim 2 wherein the optical system is further operable to:

expose a first portion of the holographic recording material to an interference pattern formed by the reference beam and the object beam, wherein the pulsed light source produces a first one of the at least two substantially different wavelengths, and expose at least one of the first portion of the holographic recording material and a second portion of the holographic recording material to an interference pattern formed by the reference beam and the object beam, wherein the pulsed light source produces a second one of the at least two substantially different wavelengths.

* * * * *